United States Patent [19]

Varney, Sr.

[11] 4,423,311

[45] Dec. 27, 1983

[54] ELECTRIC HEATING APPARATUS FOR DE-ICING PIPES

[76] Inventor: Paul Varney, Sr., Jackson La., Barre, Mass. 01005

[21] Appl. No.: 226,081

[22] Filed: Jan. 19, 1981

[51] Int. Cl.³ .......................... H05B 3/56; H05B 3/78; E03B 7/14; F16L 53/00

[52] U.S. Cl. ..................................... 219/306; 138/33; 174/47; 174/71 R; 219/208; 219/308; 219/316; 219/336; 219/523; 285/31; 285/41; 285/354

[58] Field of Search ............... 219/200, 201, 208, 280, 219/296, 299, 306, 307, 316, 318, 335, 336, 523, 308; 138/33, 35; 174/47, 71 R; 285/31, 32, 354, 41

[56] References Cited

U.S. PATENT DOCUMENTS

| | | | |
|---|---|---|---|
| 1,327,279 | 1/1920 | Hurst | 219/208 |
| 1,566,958 | 12/1925 | Gill et al. | 285/354 X |
| 2,022,529 | 11/1935 | Townsend | 285/354 X |
| 2,148,746 | 2/1939 | Hampe et al. | 285/354 X |
| 2,465,208 | 3/1949 | De Gelleke | 219/306 |
| 2,485,852 | 10/1949 | Tebo . | |
| 2,516,950 | 8/1950 | Bragg | 219/523 |
| 2,565,993 | 8/1951 | Schmid et al. | 138/33 X |
| 2,599,671 | 6/1952 | Thompson | 138/33 X |
| 2,833,909 | 5/1958 | Levey | 219/306 X |
| 3,125,657 | 3/1964 | Colten . | |
| 3,275,803 | 9/1966 | True | 219/535 |
| 3,329,803 | 7/1967 | Sink | 219/523 X |
| 3,331,946 | 7/1967 | Bilbro | 219/535 |
| 3,332,709 | 7/1967 | Kowalski | 285/31 X |
| 3,351,738 | 11/1967 | Kahn | 219/301 |
| 3,356,824 | 12/1967 | Rossetti | 219/203 |
| 3,378,673 | 4/1968 | Hopper | 219/301 |
| 3,446,909 | 5/1969 | Kahn | 174/71 |
| 3,474,378 | 10/1969 | Smith | 219/307 X |
| 3,482,080 | 12/1969 | Kassen | 219/535 |
| 3,519,023 | 7/1971 | Burns, Sr. et al. | 138/33 |
| 3,617,699 | 11/1971 | Othmer | 219/300 |
| 3,706,872 | 12/1972 | Trabilcy | 219/300 |
| 3,754,118 | 8/1973 | Booker | 219/306 X |
| 3,766,357 | 10/1973 | Koester, Jr. | 219/300 |
| 3,784,785 | 1/1974 | Noland | 219/301 |
| 3,832,525 | 8/1974 | Stanton et al. | 219/301 |
| 3,949,189 | 4/1976 | Bilbro et al. | 219/301 |
| 4,110,602 | 8/1978 | McDade | 138/33 X |
| 4,124,039 | 11/1978 | St. Lauren | 138/35 |

FOREIGN PATENT DOCUMENTS

| | | | |
|---|---|---|---|
| 102497 | 7/1963 | Norway | 138/33 |
| 166706 | 3/1934 | Switzerland | 219/306 |
| 527759 | 10/1940 | United Kingdom | 219/301 |

*Primary Examiner*—A. Bartis
*Attorney, Agent, or Firm*—Blodgett & Blodgett

[57] ABSTRACT

An apparatus for heating liquid in a pipe to prevent freezing of the liquid and for de-icing of frozen pipes includes an elongated housing constructed of plastic material and having a central bore and fittings for detachably coupling each end of the housing to the open end of a liquid pipe so that the central bore connects a first liquid pipe to a second liquid pipe. The fittings each comprise a sleeve attachable to the pipe end, a sealing gasket between the end of the housing and an annular flange on the sleeve, and a threaded coupling nut cooperating with external threads on the housing and having a flange engaging the sleeve flange. The housing includes a lateral passageway intermediate its end communicating with the central bore and closed by a sealer valve having an opening with a normally closed penetrable seal of elastomeric material. An elongated electric resistance heating cable, including a probe containing an electric heating core at the free end thereof, is slidably insertable through the penetrable seal into the housing bore and then into one of the pipes through the open end thereof. An electric control means including a switch and rheostat is mounted on the housing and connected to the heating cable for controlling the operation and temperature of the heating cable. The cable is sufficiently rigid to allow the cable to be pushed through the sealer valve into the bore and flexible enough to follow the contour of the pipe bends as the cable is pushed into the pipe.

7 Claims, 4 Drawing Figures

ELECTRIC HEATING APPARATUS FOR DE-ICING PIPES

BACKGROUND OF THE INVENTION

This invention is generally directed to an apparatus for heating liquid-carrying conduits and is particularly directed to apparatus for heating conventional water pipes in homes and in industry, specifically for the purpose of thawing or preventing the freezing of water pipes in colder climates.

Prior art pipe heaters have been generally of the type which are attached to the exterior of water pipes and which include an electrical heating element for heating the pipe and the water inside. Although the heating units are usually provided with insulation, they use a great deal of energy for thawing frozen water pipes and for preventing the freezing of water pipes. Since the pipe itself must be heated, there is a considerable heat loss to the ambient air. In addition, prior art heaters are not always effective in extreme conditions of cold for either preventing the freezing of water pipes or thawing of frozen water pipes. After a pipe has been frozen, it usually requires a considerable amount of energy and time to unthaw the frozen area within the pipe before water can flow.

Other heating devices are known which are used in conjunction with special pipes provided with auxiliary channels for electrical heating elements that are separated from the main flow passage of the pipe. These heating units are used in special applications such as in heat-exchange systems and are not adaptable to the conventional water pipes that are found in homes and industry. These and other difficulties experienced with the prior art devices have been obviated in a novel manner by the present invention.

It is, therefore, an outstanding object of the invention to provide a pipe heater that is effective for preventing freezing of liquid-carrying pipes and the thawing of such pipes in even the most severe weather conditions.

Another object of this invention is the provision of a pipe heater which is efficient in the amount of energy that it uses for preventing the freezing of liquid-carrying pipes and thawing of frozen liquid in pipes.

A further object of the present invention is the provision of the pipe heater that is easily adaptable to existing pipes or fixtures.

It is another object of the instant invention to provide a pipe heater that can concentrate heat at the exact point of freeze for thawing frozen water in pipes.

A still further object of the instant invention is the provision of a pipe heater in which the amount of heat generated by the heater to the pipe can be controlled for different conditions.

It is a further object of the invention to provide a pipe heater which is simple in construction, which is easy to install, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of apparatus for heating the liquid in a pipe to prevent freezing of the liquid and for thawing of frozen liquid in the pipe. The heating apparatus consists of a housing which is connected to the pipe and which has a passageway that is directed toward the interior of the pipe. A sealer valve is located in the passageway for sealing the aperture to permit an elongated heating cable to be threaded through the sealing valve and passageway into the pipe opening. The cable has a heating element and is operatively connected to electrical power through an electrical control means.

More specifically, the housing is constructed of a plastic material, while the heating element is a probe that is located at the end of the heating cable within the pipe. The electrical control means includes a switch for connecting the cable to a source of electrical power and a rheostat for controlling the temperature of the heating element. The housing is a tubular element open at both ends and provided with a fixture at each end, whereby the housing is effective to operatively connect the open end of a first pipe to the open end of a second pipe.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
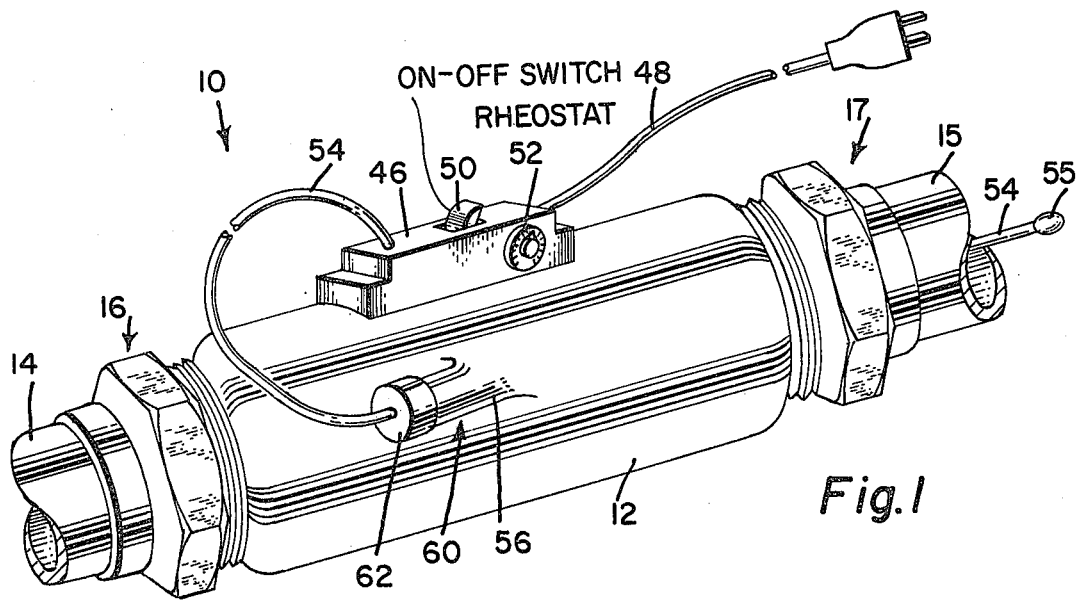
FIG. 1 is a perspective view of the pipe heater embodying the principles of the present invention and shown operatively connected to a liquid-carrying pipe.
Figure 2:
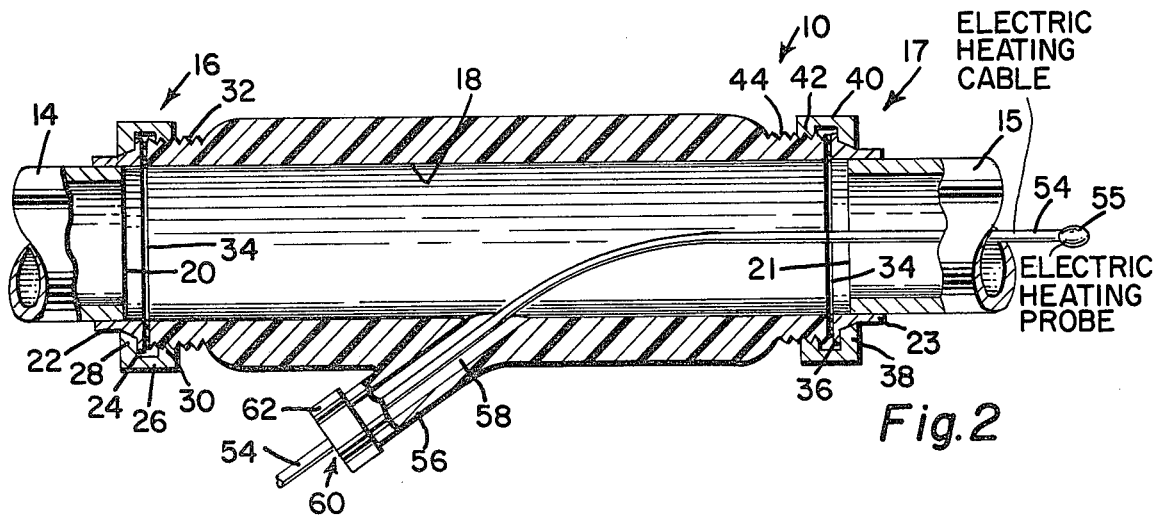
FIG. 2 is a longitudinal sectional view of the pipe heater.

Referring first to FIGS. 1 and 2, which best show the general features of the invention, the pipe heater, indicated generally by the reference numeral 10, consists of a tubular housing 12 that is connected between the open ends of a pair of fluid-carrying pipes 14 and 15 by means of fittings 16 and 17, respectively. The interior of the housing 12 is provided with a bore 18 which forms a fluid passage between the open ends 20 and 21 of the pipes 14 and 15, respectively.

The fittings 16 and 17 comprise sleeves 22 and 23 which are soldered or otherwise attached to pipes 14 and 15, respectively. The sleeve 22 has an outwardly-extending annular flange 24 for engaging an inwardly-extending annular flange 28 of a coupling nut 26. Coupling nut 26 has a threaded portion 30 provided with interior threads for engaging the outer threads of a reduced end portion 32 of the housing. An O-ring seal 34 is located between the sleeve 22 and the end of the reduced end portion 32 of the housing. By turning the coupling nut 26, a tight seal is formed between the end of pipe 14 and the end 32 of the housing.

The sleeve 23 of the fitting 17 has a similar outwardly-extending annular flange 36 for engaging an inwardly-extending annular flange 38 of a coupling nut 40. The coupling nut also has a threaded portion 42 provided within internal threads for engaging the external threads of a reduced end portion 44 of the housing.

An electrical control unit 46 is mounted on the outside of the housing 12 and is provided with a cord 48 for connecting the unit to a conventional electrical outlet. The unit 46 contains a power switch 50, by which the unit may be turned on and off, and a rheostat 52. Preferably, the unit 46 is also provided with an automatic circuit breaker for safety reasons. A heating cable 54 is connected to the unit 46 and extends through a sealer valve, generally indicated by the reference numeral 60, that is mounted on the outer end of an outwardly-projecting portion 56 which is provided with a passageway 58. The passageway 58 is connected to the bore 18, so that, as the cable 54 is threaded into the passageway 58 through the sealer valve 60, it enters bore 18 so that, as the cable 54 is threaded into the passageway 58 through the sealer valve 60, it enters bore 18 and eventually enters into the interior of the pipe 15 through the opening 21. The cable 54 is semi-rigid; it is rigid enough to be pushed through the sealer valve 60 and into the pipe 15 and flexible enough to follow the interior contour of any bends in the pipe. The outwardly-projecting portion 56 extends at an acute angle with respect to the outer surface of the housing 12, so that, as the cable 54 is inserted into the housing, it will be directed toward the pipe 15. This prevents a random shunting of the cable, because the direction in which the cable 54 will travel is controlled by the manner in which the housing 12 is connected to the pipes 14 and 15. An oval shaped probe 55 is connected to the end of the cable 54 and is provided with heating coils. Although the entire cable 54 provides heat, there is a greater concentration of heat at the probe.

Figure 3:
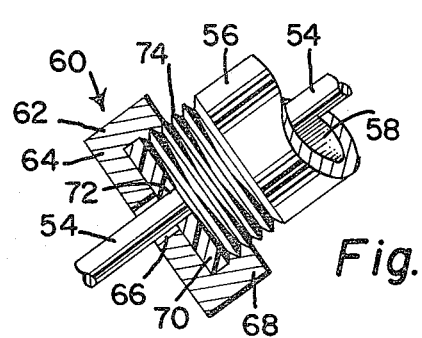
FIG. 3 is a fragmentary sectional view of a sealer valve.

Referring particularly to FIG. 3, the sealer valve 60 consists of a cap 62 that has an end wall 64 and of an annular side wall 68. The end wall 64 is provided with a central hole 66 and the annular side wall 68 is provided with internal threads for threadedly engaging the external threads 64 at the end of the outwardly projecting portion 56. A washer 70 is located within the annular side wall 68 of the cap and is provided with a central opening 72 that is axially aligned with the central hole 66 of the cap 64. The washer 70 is made of an elastomeric material and the central opening 72 is normally closed, so that the washer 70 normally seals the central hole 66. However, the washer 70 is resiliently yieldable; this allows the cable 54 to be inserted through the opening 72 into the aperture 58, while the central hole 66 remains sealed with respect to the passageway.

The operation and the advantages of the present invention will now be readily understood in view of the above description. A plurality of pipe heater units 10 are installed at various locations in the water line either as part of the original plumbing installation or as adaptors for existing plumbing. Normally, the heaters 10 would be installed in locations where freezing is likely to occur. In addition, the heater can be installed in situations where freezing has already occurred.

When the pipe heater 10 is installed with existing plumbing, a section of the pipe is removed, in order to produce two, spaced, open-ended pipes, such as the pipes 14 and 15 shown in FIG. 2. The housing 12 is placed between the pipes 14 and 15 with the bore 18 in axial alignment with the openings 20 and 21 of the pipes. Sleeves 22 and 23 are placed over the ends of the pipes 14 and 15 and are soldered into place. The fittings 16 and 17 are sealed by rotating the coupling nuts 26 and 27, so that they each advance toward the center of the housing 12. In this way, the bore 18 forms a bridging passageway between the openings 20 and 21 to allow water to flow from pipe 15 to pipe 14.

When the pipe heater 10 is installed with plastic pipe, the ends of pipes 14 and 15 are provided with external threads and the sleeves 22 and 23 are provided with internal threads.

Preferably, the pipe heater 10 is installed at a point in the pipe line beyond the likely freezing area and the probe is extended through the freezing area to another non-freezing area so that freezing in the pipe line can be prevented.

After the pipe heater 10 has been installed, as shown in FIGS. 1 and 2, the cable 54 is inserted into the sealer valve 60 through opening 66 and into the bore 18. The threading of the cable 54 through the sealer valve 60 continues until the probe 55 reaches a predetermined position within the pipe 15. This position may be near the housing 12 or it may be at a location considerably spaced from the housing, for instance, at a point where it is estimated that freezing is likely to take place. Also, the location of the probe 55 can be changed at any time if it is later discovered that the original location of the probe 55 was not an optimum point. Ideally, the heating units are installed and operated in a manner that all freezing in the pipe lines will be prevented. However, in the event that freezing does occur, because of a failure to turn on a particular unit during an unexpectedly cold night, the probe 55 can be moved through the pipe 15 to the point of freezing. In this way, all of the heat generated by the probe 55 can be concentrated completely at the freeze point, so that thawing will take place quickly and efficiently.

The switch 50 allows the pipe heater 10 to be shut off during warmer periods and the rheostat 52 controls the amount of heat generated by the heater cable 54 and the probe 55, depending on the weather conditions. By controlling the rheostat 52, the pipe heater will generate just enough heat to prevent the pipes from freezing, thus conveying energy. Also, the fact that heat is generated within the pipe where freezing occurs, heat lost to the ambient air outside of the pipe is kept to a minimum.

MODIFICATION

Figure 4:
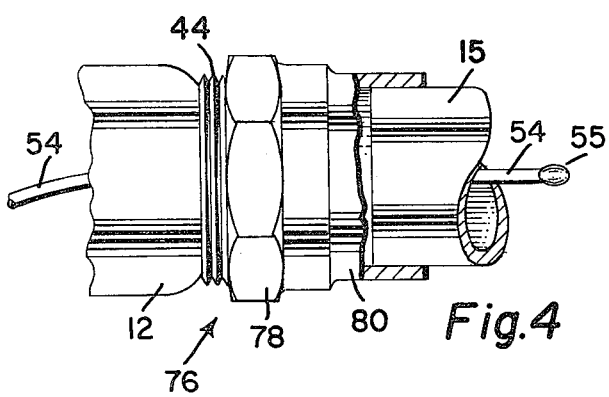
FIG. 4 is a fragmentary view of a modification of a coupling portion of the water heater, with portions in section.

Referring to FIG. 4, there is shown a modified coupling fitting, generally indicated by the reference numeral 76, for attaching the end of the housing 12 to the open end of a liquid-carrying pipe. The fixture 76 includes a nut portion 78 integrally formed with a sleeve portion 80. The housing 12 is attached to the pipe 15, as shown in FIG. 4, by sliding the sleeve portion 80 over the end of the pipe 15 and then rotating the entire fixture 76. In this way the nut portion 78 is threaded on the reduced threaded end portion 44 of the housing. The fixture is then secured to the pipe 15 by soldering the sleeve portion 80 to the pipe 15. A similar fixture 76 may be used for securing the opposite end 32 of the housing to the pipe 14, if desired.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for heating liquid-carrying pipes to prevent freezing of the liquid and thawing of frozen liquid in the pipes, said apparatus comprising:

(a) a housing having a lateral passageway and a central bore connected to an opening at each end of the housing and to the passageway, each end of the housing being provided with external threads and a fitting for sealingly attaching the housing to the open end of a liquid pipe, so that the bore of the housing is effective to connect the open end of a first pipe to the open end of a second pipe, each of said fittings comprising:
  (1) a sleeve that is attachable to the end of the pipe and has an outwardly extending annular flange,
  (2) a sealing gasket between the annular flange and the end of the housing, and
  (3) a coupling nut provided with internal threads for threadingly and engaging the external threads of the housing and an inwardly extending annular flange for engaging and outwardly extending flange of the sleeve,
(b) a sealer valve for sealing the passageway and having an opening with a normally closed penetrable seal of elastomeric material adapted to slidably receive an elongated continuous element and to permit said element to move axially through the valve in a sealed relationship,
(c) electrical control means being mounted on the exterior of the housing and adapted to receive electrical power, and
(d) an elongated heating cable having a first and electrically connected to the control means to receive power therefrom and having a second free end slidably insertable through the penetrable seal of the sealer valve through the passageway into the housing bore and then into one of the pipes through the open end thereof, said cable being provided with a heating element for receiving power through the cable from the control means.

2. Apparatus as recited in claim 1, wherein the housing is constructed of a plastic material.

3. Apparatus as recited in claim 1, wherein the heating element includes a probe located at the free end of the cable insertable into the housing, said probe containing a heating coil for concentrating heat at the probe.

4. Apparatus as recited in claim 1, wherein the cable is sufficiently rigid to allow the cable to be pushed through the valve passageway and bore into the interior of one of the liquid carrying pipe and flexible enough to follow the contour of bends in the pipe as the cable is pushed into the pipe.

5. Apparatus as recited in claim 1, wherein the electrical control means comprises:
  (a) a switch for connecting the cable to the electrical power, and
  (b) a rheostat for controlling the temperature of the heating element.

6. Apparatus as recited in claim 1, wherein the housing is provided with an outwardly projecting portion, said passageway extending from the outer end of the projecting portion into the bore and wherein the sealer valve is located at the outer end of the projecting portion.

7. Apparatus as recited in claim 6, wherein the outer end of the projecting portion is provided with external threads and the sealer valve comprises:
  (a) a cap having an end wall with a central hole and an annular side wall provided with internal threads for threadingly engaging the threads at the end of the projecting portion, and
  (b) an elastomeric washer located within the side wall of the cap for sealing said central hole, said washer being provided with a central opening aligned with the hole in the cap, said central opening being normally closed and being resiliently yieldable to permit passage of the cable therethrough.

* * * * *